(12) United States Patent
Hoy et al.

(10) Patent No.: US 9,888,040 B2
(45) Date of Patent: Feb. 6, 2018

(54) SECURE APPLICATION ZONES FOR CLOUD BURST ENVIRONMENTS

(71) Applicant: International Business Machines Corporation, Armonk, NY (US)

(72) Inventors: Jeffrey Robert Hoy, Southern Pines, NC (US); Nataraj Nagaratnam, Cary, NC (US); Kaushal Kiran Kapadia, Pune (IN); Ravi Krishnan Muthukrishnan, Durham, NC (US); Sreekanth Ramakrishna Iyer, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/797,077

(22) Filed: Jul. 11, 2015

(65) Prior Publication Data

US 2017/0013021 A1    Jan. 12, 2017

(51) Int. Cl.
    *H04L 29/06* (2006.01)
    *H04L 29/08* (2006.01)

(52) U.S. Cl.
    CPC ........ *H04L 63/205* (2013.01); *H04L 63/0209* (2013.01); *H04L 67/10* (2013.01)

(58) Field of Classification Search
    CPC .... H04L 63/205; H04L 63/0209; H04L 67/10
    (Continued)

(56) References Cited

U.S. PATENT DOCUMENTS

| | | | |
|---|---|---|---|
| 2010/0132016 A1* | 5/2010 | Ferris | G06F 21/6218 726/4 |
| 2012/0254433 A1 | 10/2012 | Gujral et al. | |
| 2013/0238772 A1* | 9/2013 | Armour | G06F 9/4843 709/223 |

FOREIGN PATENT DOCUMENTS

WO    WO2013133999 A1    12/2013

OTHER PUBLICATIONS

Jain et al, "A Novel Cloud Bursting Brokerage and Aggregation (CBBA) Algorithm for Multi Cloud Environment," Second International Conference on Advanced Computing & Communication Technologies, 2012.

(Continued)

*Primary Examiner* — Baotran N To
(74) *Attorney, Agent, or Firm* — Jeffrey S. LaBaw; David H. Judson

(57) ABSTRACT

A cloud infrastructure security assurance service is enhanced to facilitate bursting of cloud applications into other cloud infrastructures. The security assurance service provides a mechanism to enable creation and management of secure application zones within a cloud infrastructure. When the security assurance service receives an indication that a workload associated with a cloud application triggers a cloud burst, the service is extended into a new cloud infrastructure. Once the security assurance service is instantiated in the new cloud infrastructure, it identifies the broad security requirements of the application, as well as the security capabilities of the new environment. Using this information, the security assurance service computes a minimal security environment needed by the cloud application for the burst operation. The security assurance service then configures the necessary topology in the new cloud environment, and the burst operation is then completed by having the cloud application deployed in that topology.

18 Claims, 7 Drawing Sheets

(58) Field of Classification Search
USPC .............................................................. 726/1
See application file for complete search history.

(56) References Cited

OTHER PUBLICATIONS

Jain et al, "A Survey and Analysis of Cloud Model-Based Security for Computing Secure Cloud Bursting and Aggregation in Renal Environment," World Congress on Information and Communication Technologies, 2011.
Lemos et al, "IBM CloudBurst on System X," IBM Redbooks, Apr. 2012.

* cited by examiner

SECURE APPLICATION ZONES FOR CLOUD BURST ENVIRONMENTS

BACKGROUND OF THE INVENTION

Technical Field

This disclosure relates generally to deploying applications in a "cloud" compute environment.

Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

It is known in the art to provide appliance-based or platform-based solutions to facilitate rapid adoption and deployment of cloud-based offerings. Typically, a cloud-based offering is deployed as a cloud application package. One such appliance that may be used for this purpose is IBM® Workload Deployer, which is based on the IBM DataPower® 7199/9005 product family. Typically, the appliance is positioned directly between the business workloads that many organizations use and the underlying cloud infrastructure and platform components. Alternatively, cloud application packages may be deployed using platform-as-a-service (PAS) infrastructure, such as the IBM® Smart-Cloud® Orchestrator open cloud management platform. A management platform of this type typically comprises several layers including an infrastructure services layer for provisioning, configuring and managing storage, compute and network resources, a platform services layer, and an orchestration services layer to provide business process management. The platform services layer includes virtual machine image lifecycle management capabilities and related services.

As security software deployments become increasingly complex, application developers are further removed from the inner workings of the security environment. As a consequence, security operations often are left to the security experts. The move to virtualization and private clouds, however, empowers application developers with more and more operational capability. Application developers then find themselves in a difficult position. In particular, when putting an application into production, the developer may not have the necessary background and context to evaluate properly the security impact and needs of his or her application. Today, application developers often work with security experts to design a strategy for secure application deployment. The security expert, however, may encounter the same problem, but from the other direction. As applications and middleware become increasingly complex and virtualized, the security expert may not fully understand the application to properly evaluate its security impact and needs.

Cloud bursting refers to the notion of moving applications to the cloud in time of high-demand, often using clone techniques. Cloud burst targets may be public clouds providing remote compute capability, for example, bursting a local enterprise application into a public cloud to meet peak demand. Security capabilities in the cloud burst target, however, may be different and/or more limited than security capabilities in the enterprise environment. The cloud burst scenario then needs to take into account differences in security capabilities for the new environment.

BRIEF SUMMARY

According to this disclosure, a cloud infrastructure "security assurance" service is enhanced to facilitate bursting of cloud applications into other cloud infrastructures. The security assurance service provides a mechanism to enable the creation and management of secure application zones within a cloud infrastructure. A secure application zone is a collection of managed security infrastructure deployed and maintained to protect a cloud application (or a set of such applications), and the collection typically depends on a given security requirement that may be specified at a coarse level (e.g., high, medium, low, etc.). When the security assurance service receives an indication that a workload associated with a cloud application triggers a cloud burst, the security assurance service in effect is "extended" into a new cloud infrastructure, which may be one of many available for the burst operation. Once the security assurance service is instantiated in the new cloud infrastructure, it identifies the broad security requirements of the application, as well as the security capabilities of the new environment. Using this information, the security assurance service computes a minimal security environment needed by the cloud application for the burst operation. The security assurance service then configures the necessary topology in the new cloud environment, and the burst operation is then completed by having the cloud application deployed in that topology.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
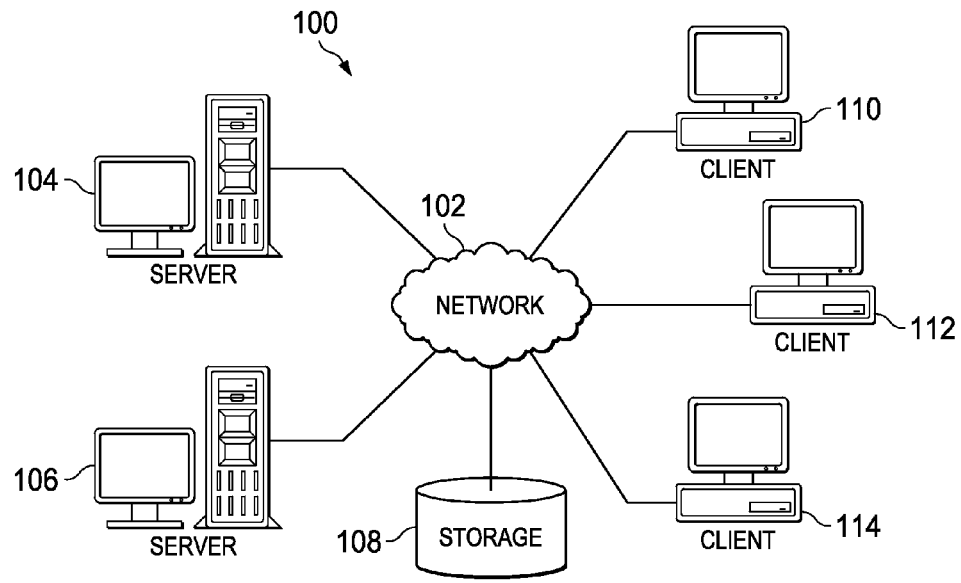
FIG. 1 depicts an exemplary block diagram of a distributed data processing environment in which exemplary aspects of the illustrative embodiments may be implemented.
Figure 2:
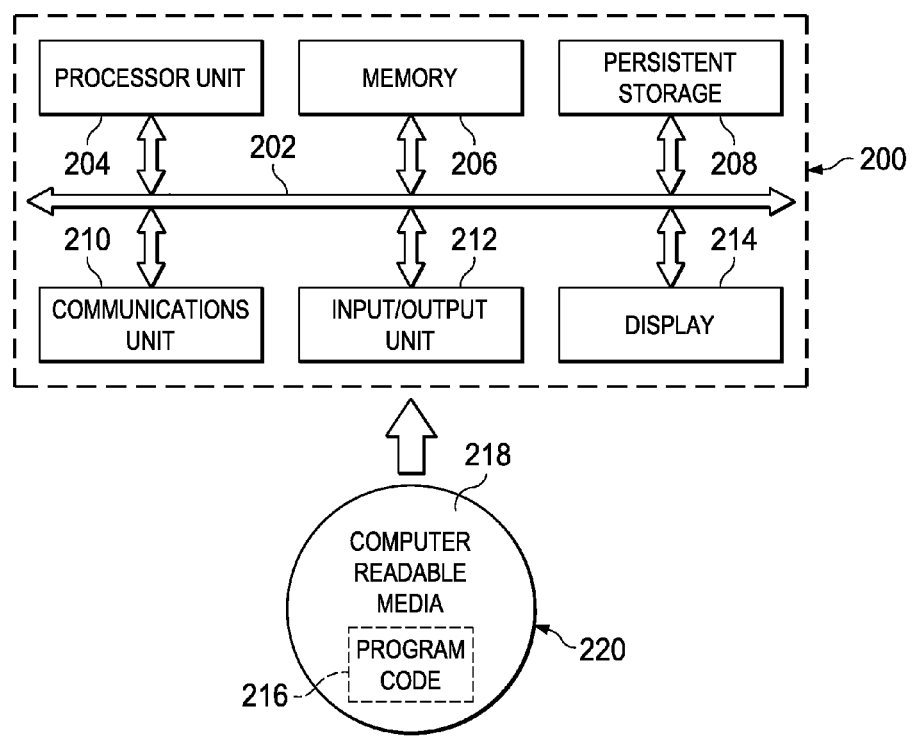
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
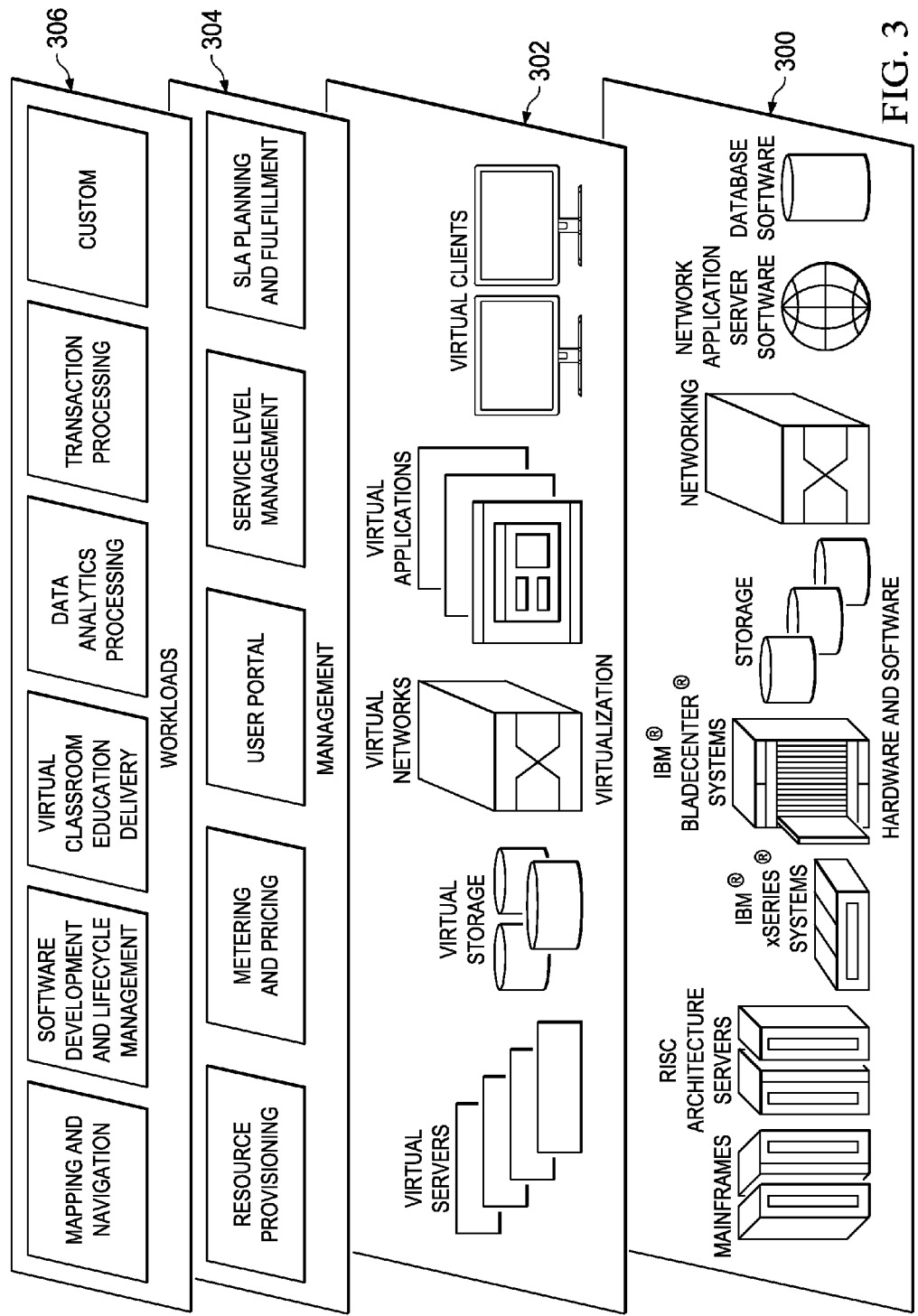
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Cloud Deployment Technologies

It is known to provide an appliance-based solution to facilitate rapid adoption and deployment of both Infrastructure and Platform as Service offerings. As described above, one such appliance is IBM Workload Deployer (IWD), and this appliance also may be used to manage a shared, multi-tenant environment, where isolation and security are of utmost importance. The secure nature of the physical appliance (sometimes referred to herein as a box) typically is provided by a self-disabling switch, which is triggered if the appliance cover is removed. This physical security enables the appliance to serve as a secure vault for credentials, which can be tied to virtual images throughout their entire lifecycle (in storage, being dispensed, running in the cloud, or being removed from the cloud). IBM Workload Deployer also contains a storage driver that streamlines the storage of image customizations. It also serves as a dedicated store for both pre-loaded and customized middleware virtual images and patterns. The appliance also includes advanced compression and storage techniques that enable a large number of these virtual images (each of which may be sizeable) to be stored.

In operation, the appliance can provision standard and customized middleware virtual images and patterns that can be securely deployed and managed within private or on-premise cloud computing environments. These virtual images can help organizations to develop, test, and deploy business applications easily and quickly, thus ending the manual, repetitive, and error prone processes that are often associated with creating these complex environments. Upon completion, resources are returned to the shared resource pool automatically for future use and are logged for internal charge-back purposes. The appliance also manages individual user and group access to resources, providing IT managers with the control needed to optimize efficiency at a fine-grain level.

Typically, the appliance includes hardware and firmware cryptographic support to encrypt all the data on hard disk. This data includes, without limitation, event log data. No users, including administrative users, can access any data on physical disk. In particular, the operating system (e.g., Linux) locks down the root account and does not provide a command shell, and the user does not have file system access. When an administrator performs a backup of the appliance, the backup image is encrypted to protect the confidentiality of the data. When restoring an encrypted image, a decryption key thus is needed to decrypt the backup image to enable the data to be restored to the appliance.

Figure 4:
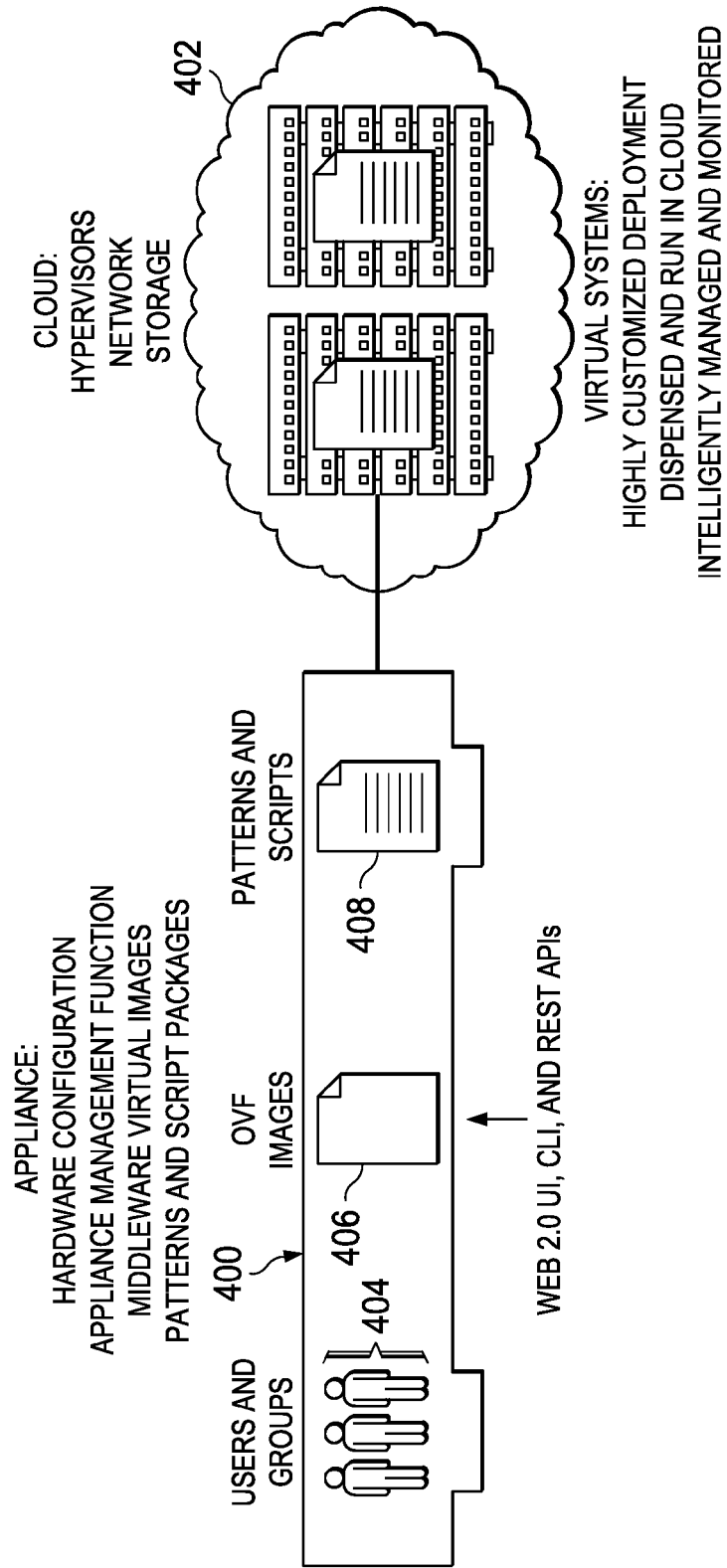
FIG. 4 illustrates an exemplary operating environment in which a network-based appliance may be used to facilitate deployment of one or more cloud-based offerings.

Referring to FIG. 4, a representative operating environment includes the physical appliance 400, which interfaces to the cloud 402. The appliance may be implemented using a data processing system such as described above with respect to FIG. 2. Preferably, the appliance 400 includes a Web 2.0-based user interface (UI), a command line interface (CLI), and REST-based application programming interfaces (APIs). The appliance provides a management function that enables the rapid deployment of cloud-based solutions. To that end, the appliance provides storage for (i) data 404 used to manage user and group access to resources, (ii) for pre-loaded and/or customizable middleware virtual images 406, and (iii) for configurable patterns and script packages 408. Patterns are logical descriptions of both the physical and virtual assets that comprise a particular solution. As will be described in more detail below, preferably patterns are structured according to the TOSCA specification. The management function and interfaces provide a template-based approach to construction that permits the rapid creation and modification of an otherwise complex set of hardware and software components. In particular, the use of patterns allows an organization to construct an individual element or integrated solution one time, and then to dispense the final product on demand. Typically, there are two types of patterns: virtual system patterns provide the most flexibility and customization options of the two types. It consists of an operating system and, potentially, additional software solutions, such as WebSphere® Application Server. Virtual application patterns are optimized and are constructed typically for the purpose of supporting a singular workload.

As also seen in FIG. 4, the on-premise or private cloud environment 402 on which the middleware application runs typically constitutes hypervisors, networking infrastructure, and storage devices that are allocated to the appliance. A representative environment may be implemented in the manner described above with respect to FIG. 3.

Figure 5:
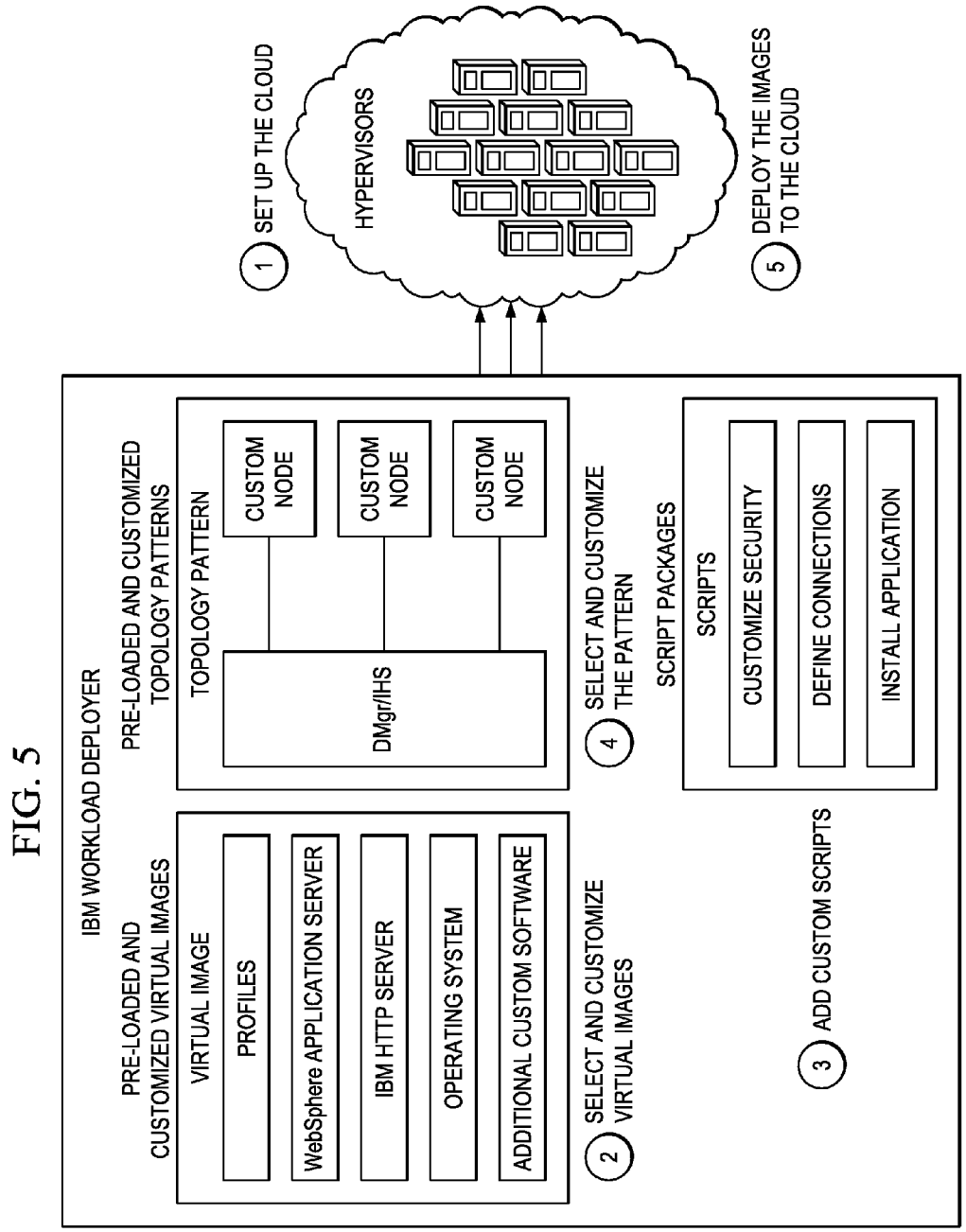
FIG. 5 illustrative representative functional components of the network-based appliance.

FIG. 5 illustrates how the appliance can be used to build a custom private cloud. At step 1, the hardware, hypervisors and networking for the cloud are identified. At step 2, the user selects and customizes the virtual images. At step 3, the user adds one or more script packages as needed to customize the deployed middleware environment. At step 4, pre-installed or customized patterns are used to describe the middleware topology to be deployed. Patterns can be built from virtual images, e.g. using a drag-and-drop interface. At step 5, the virtual systems are deployed to the cloud.

The references herein to IBM Workload Deployer are exemplary and should not be taken to limit the disclosed technique, which may be implemented on any appliance (or, more generally, machine) having the general characteristics and operating functionality that has been described. Specific references to IWD should be construed to include both the above-identified product, as well as other technologies that implement the functionality referenced above.

Context-Based Security Assurance Service

As further background, the following section describes a "context-based security assurance service" or a "security assurance service" (or just the "service" as a short-hand) in which the cloud bursting techniques of this disclosure are implemented.

Without limitation, the security assurance service may be implemented within or in association with a cloud deployment platform system or appliance (FIG. 4) as has been described, or using any other type of deployment systems, products, devices, programs or processes. A representative cloud application platform with which the security assurance service may be implemented includes, without limitation, IBM® PureApplication System, which is a platform system specifically design and tuned for running applications, and that supports the use of patterns for easy deployment into its cloud environment. The reference to this commercial system is not intended to be limited, as the security assurance service may interoperate with any cloud infrastructure.

The security assurance service may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

The following is a high-level description of the security assurance service. Generally, the service operates generally to gather (or otherwise obtain from other data sources) information about available cloud platforms, topologies and capabilities. The service also identifies security capabilities that are available to be setup. These security capabilities include, without limitation, virtual perimeter networks (DMZs), network segregation, storage isolation, Intrusion Prevention System (IPS) deployment, Security Information and Event Management (SIEM) deployment, reverse proxies, firewalls, SSL communication, configuration with existing SIEM, multi-factor authentication, risk-based authentication, and others. Preferably, the service simplifies (or abstracts) the available capabilities into easy-to-understand security assurance categories for the environment's existing topology. As a non-limiting and representative example, one such categorization may include "high/medium/low"-style categories, where, say, a "medium" assurance may correspond to SSL-protected traffic, IPS and SIEM integration, but no resource segregation and isolation of multi-factor authentication.

Preferably, the assurance service exposes the categories to the user (during application deployment) as "templates." A template has a given set of one or more security configuration changes associated therewith. The user (typically the application developer) then selects one or more of such security templates that he or she would like the service to configure/provision the application against. The service may provide a recommendation to the user in this regard. Based on the user selections, the service then interprets the requested one or more security assurance templates and, in response, generates a concrete list of one or more security configuration changes (typically changes/updates to security settings to existing security infrastructure). Optionally, the service also generates a note to the security administrator(s) of the capabilities being used for the application. During the application deployment, the service applies the security changes, preferably remotely, using REST-based (or equivalent) interfaces to existing (configured) security products, and, as necessary to meet the template(s), it also deploys new security software instances (as applicable and if licenses are available). The service may also provision hardware and network environments, preferably using existing cloud facilities, and as needed by the application. In this manner, the security assurance service creates a context-specific secure cloud application zone for the application-being-deployed. The application deployment platform is called-back when the security configuration update completes; the platform then completes the deployments, and activates the newly-deployed and secured application.

As described, the assurance service preferably operates in a context-based manner, taking into consideration the "context" in which the application is to be deployed. Representative "context" information includes, without limitation, the nature of the target platform, the nature of the environment in which the workload is anticipated to execute, the nature of any compliance or other regulatory requirements for the workload, and so forth. Thus, for example, if the workload is being deployed on the Amazon cloud (which is public), the service would consider public cloud requirements, such as SSL communication for all traffic, even though such requirements would not necessarily be enforced in a private cloud. As another example, if the workload is running in a test or development environment, service may only provision minimal controls around data, as the application (in this context) would not be handling real (live) customer data. As yet another example, if the workload needs to be PCI-compliant, then the service may provision it only on a certain network but not allow (or otherwise block) the move of the workload to a network or VLAN that is not secure. These are merely representative examples. The security context information is gathered by the security assurance service directly, or such information is made available to the security assurance service from other connected data sources that have that information (or access to that information).

Figure 6:
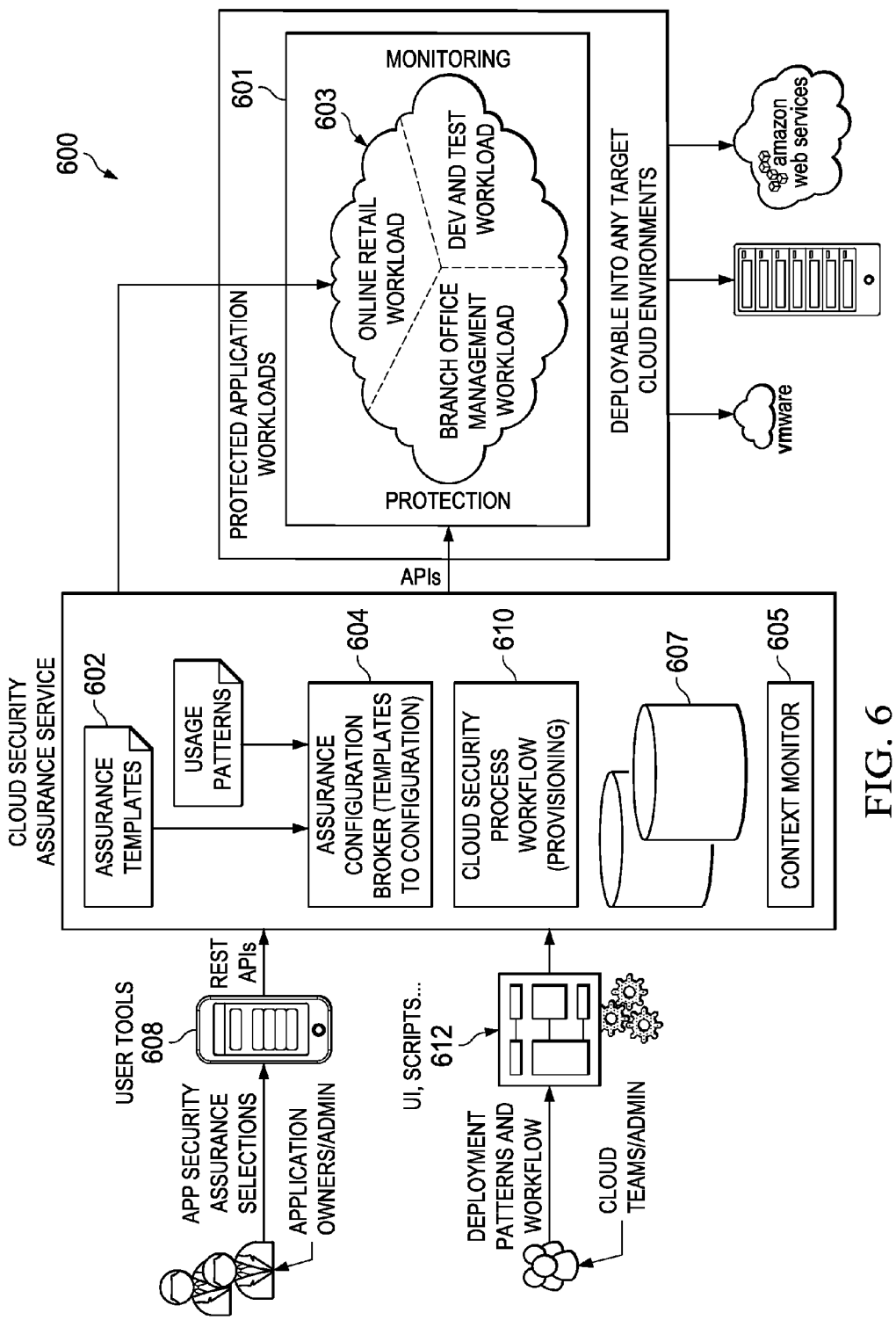
FIG. 6 illustrates a block diagram of the basic operational components of the security assurance service of this disclosure.

FIG. 6 illustrates the basic components of a representative embodiment of a cloud security assurance service 600. As described, the approach provides for a centralized or federated service that manages all (or defined ones of) security resources impacted by application deployment. These resources may be quite varied and include, among others, reverse proxies, HTTP servers, authorization updates, addition of new identities, provisioning of VPNs, log integration with a SIEM solution, DMZs, firewall configuration to open ports, and so forth. Preferably, the service invokes remote interfaces (e.g., REST-based interfaces) to update configurations for the security resources. The determination of which security resources get updated and how depends on a template-based approach. In particular, the service 600 provides for one or more security assurance templates 602 (or just "templates") that are preferably based on and derived from available resources and configuration information discovered by (or otherwise made available to) the service. In the alternative, a security template may be predefined or relatively "static" based on information derived from other security infrastructure implementations (or knowledge bases). Preferably, and as used herein, the assurance templates 602 are modules within the service that provide easy-to-understand security categories or profiles, and their associated security levels, such as "high/medium/low internal network security" and "high/medium/low firewall security," and the like. The service 600 also includes an assurance configuration broker 604, which identifies the security goals of selected templates, and that operates to translate selection of a template into detailed configuration steps, preferably based on system configuration and context of available resources. This translation operation is described in more detail below.

As depicted, the security assurance service also preferably includes (or has associated therewith) a context monitor 606, which catalogs and tracks cloud topologies and capabilities. Further, the service includes (or has associated therewith) a security management interface 608, which is a configuration point that is used to add or remove security templates, to provide manual configuration of managed security resources, and/or to override (under permitted circumstances) a security template selected by an end user. The security assurance service also includes a cloud security process workflow 610, which is a module that invokes appropriate (e.g. REST-based) interfaces to apply changes to underlying security infrastructure (security resources) as indicated by the configuration broker 604. An assurance pattern module 612 is a cloud-specific service that coordinates application deployment and provisioning with the security assurance service 600. Typically, the assurance pattern module 612 comprises a component of some other cloud application platform, although this is not a requirement. The assurance pattern module 612 queries the assurance service for available assurance templates 602 based on the application being deployed.

In FIG. 6, the application owners/administrators at the top left represent the application deployer(s); these are individuals who preferably only need to have access to the easy-to-understand security assurance level designators (by category/security level). The cloud teams or other administrators at the bottom left represent individuals who might require more specific information about the underlying security settings for security resources that provide these security assurance levels.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the security assurance service be executed by a particular component as named above, as the functionality herein (or any aspect thereof) may be implemented in other or systems.

The security assurance service may be implemented by a cloud service provider that operates infrastructure for a private cloud, a public cloud, or a hybrid cloud. In one particular implementation scenario, an enterprise has an associated private cloud (implemented within a cloud service) that is managed by a cloud application platform. That platform may then be augmented to interoperate with (or to actually include) the security assurance service of this disclosure. More generally, the security assurance service may be implemented by an enterprise in a standalone manner. It may be available as a managed service provided by a cloud service or some other service provider.

The service operates by having an end user provide a generalized specification of a security level (e.g., "high network security") that the service then uses (after interpreting application requirements and available resources) to generate a security-optimized deployment for an application. Typically, the application is being deployed into an existing environment, and the security assurance service operates to define and/or tailor the security configuration changes required for that existing environment (into which the application will be deployed). The security-optimized deployment for the application is sometimes referred to herein as a secure context-based "cloud application zone" or, as a shorthand, a "secure application zone."

The "security levels" as used herein are sometimes referred to as "security assurance levels." These levels, as noted above, are exposed as easy-to-understand or "coarse" grained descriptors ("high" or "low"), as compared to more fine-grained specificity that might otherwise be known or available to, say, a security expert. The terms "coarse" or "fine" are relative phrases, but the notion of a "coarse" designation of a security assurance level is one that merely provides the basic information available to the user who might not otherwise know or be able to ascertain (or care about) the explicit security requirements underlying a particular "coarse" security assurance level. It is sufficient for the user in this circumstance to know only that the security assurance level he or she desires (for a particular category) be "high" or "low" or some other such classification (however delineated). Thus, the term "high" (in reference to a particular coarse security assurance level) may be designated in the alternative by a numerical value, some other identifier or designation.

In a representative embodiment, the service exposes, provides or interoperates with a set of security templates, which may be categorized according to type. These templates are provided by the assurance template module shown in FIG. 6. Thus, for example, the service may expose security templates having the following categories: "Internal Network Security," "Application Security," "Data Security" and "Intruder Protection." These are merely representative. A particular template category may then be identified according to a defined security level: such as "Low" or "High." The service may provide just "Low" or "High" templates, or it may provide further levels (e.g., Low, Medium and High, or further more specific levels, etc.). A particular enterprise application being deployed thus may have one or more such security templates associated therewith, each defining a category and a specified security level. Thus, for example, a particular application being deployed may have the following specification: Internal Network Security (Low), Application Security (High), Data Security (High) and Intruder Protection (High). A web-based or other configuration interface may be used to specify the one or more security templates that are to be associated with a particular application being deployed. This interface may be associated with a conventional workload deployment tool, such as IBM® Workload Deployer Virtual Application Builder. In an alternative, the categories and security levels are defined automatically or programmatically, or such information is made available from a repository of such data published by another source.

As used herein, a "template" or "security template" refers to a profile or set of security settings that are expected to provide a specific level of security on or with respect to a given security resource, which security resource may be a system, device, appliance, program, process or other computing entity within the security infrastructure. Preferably, each security template has associated therewith one or more security configurations (security resource settings) that implement the category (and at the specified level). Preferably, these security configurations are identified by the security assurance configuration broker component (see, FIG. 6), which takes (as input) the security goals of the selected template and translates that selection into detailed configuration steps (or changes) based on the system configuration and the context of available resources (as supplied by the context monitor).

Thus, for example, if the application category is "Internal Network Security" and the security level is, say, "Low," the broker determines that the detailed security steps necessary to implement that template might include: (i) creating a "junction" between a front-end proxy server and a back-end Web application server based on application endpoint, (ii) use basic authentication for the junction and configure a trust association interceptor (TAI) in the application server for single sign-on (SSO), and (iii) enable restrictive firewalls, and open ports to the application endpoint. As another example, if the application category is "Application Security" and the security level is, say, "High," the detailed security steps necessary to implement that template might include: (i) run a security analytic tool (e.g., AppScan) against endpoints and halt deployment if any critical vulnerabilities are identified, (ii) instruct the cloud application platform to provision a VPN to host the application in the cloud, (iii) configure access manager policies for authorized roles defined by the application, and (iv) create an additional software-based DMZ in the cloud dedicated to the application. As yet another example, if the application category is "Data Security" and the security level is, say, "Low," the detailed security steps necessary to implement that template might include (i) update application server to use an SSL connection to the database, or the like. As still another example, if the application category is "Intruder Protection" and the security level is, say, "High," the detailed security steps necessary to implement that template might include: (i) configure the security intelligence platform (e.g., IBM® QRadar) log sources, (ii) update SIEM filters for the application, and (iii) update IPS rules for the application. Of course, these are merely representative (non-limiting) examples of the security configuration changes. The particular changes that are implemented by the security assurance service will depend on the implementation and available resources (products, systems, configurations, and the like).

Thus, when the cloud provider deploys the application (or initiates the deployment), it notifies the security assurance service of the one or more selected (or otherwise defined or prescribed) security templates. Preferably, the cloud provider also sends the assurance service details of the application. The security assurance service takes the selected templates as guidance, and the broker component then tailors the detailed security configuration changes required for the existing environment to support the application within the selected security constraints that have been specified and the context of available resources (as determined by the context monitor). If desired, these security configuration changes may be presented to a security administrator for verification before being implemented. Upon verification (if that optional operation is implemented), the security assurance service preferably invokes remote interfaces for software configuration. In addition, and if necessary, the service communicates with the cloud provider to obtain information about any prerequisites (of the cloud provider) that may need to be addressed when deploying the application. These prerequisites may include, for example, creation of a VPN, or other security requirements unique to the provider.

Secure Application Zones for Cloud Burst Environments

With the above as background, the techniques of this disclosure are now described.

Generally, the techniques of this disclosure provide for automated creation and management of secure cloud application zones in a cloud burst scenario where the security environment matches the capability (but not necessarily the deployment topology) for the existing applications that are bursting. The cloud bursting technique preferably leverages the security assurance service (and the secure application zones created thereby) as described above. It assumes the existence of a cloud bursting system that operates in a known manner, such as by cloning. As described above, cloud-bursting is a known technology solution, and systems of this type are enhanced according to the techniques herein to leverage the security assurance service in a manner that is now described.

Figure 7:
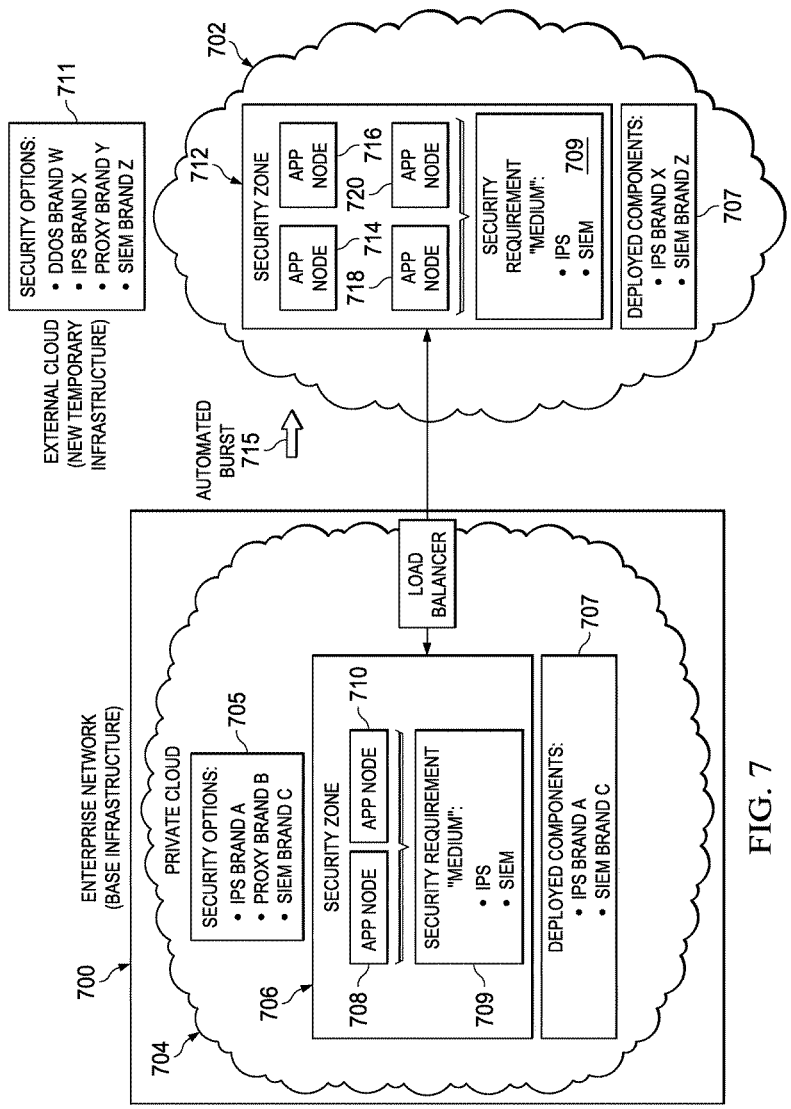
FIG. 7 illustrates an example topology in a cloud burst scenario with secure application zones according to this disclosure.

The security assurance service-supported cloud bursting functionality of this disclosure is depicted generally in FIG. 7. Here, it is assumed that there is an enterprise network (a base infrastructure) 700 having one or more applications that are desired to be burst, e.g., to an external cloud (new temporary infrastructure) 702. As will be described below, the external cloud infrastructure may be one of several candidate clouds for the burst operation. For illustrative purposes only, the enterprise network 700 comprises private cloud 704 having security zone 706 that supports application nodes 708 and 710. It is assumed that the security zone 706 has been established using the security assurance service in the manner previously described. The external cloud (the burst target) will be provisioned by the security assurance service (either directly by extension of the service in the enterprise 700, or by instantiating a new instance of the security assurance service if needed) to include security zone 712 that supports application nodes 714, 716, 718 and 720. In this example scenario, the security options 705 for the security zone 706 in the enterprise private cloud 704 are IPS Brand A, Proxy Brand B and SIEM Brand C. The deployed components 707 in the security zone 706 are IPS Brand A, and SIEM Brand C, and the security level (requirement) 709 in the security zone 706 is established as "medium." For the burst target, it is assumed that the security options 711 are distinct, e.g., DDoS Brand W, IPS Brand X, Proxy Brand Y and SIEM Brand Z. The deployed components 713, e.g., IPS Brand X and SIEM Brand Z, also are distinct from the deployed components 707 in the enterprise. Of course, the nature and configuration of the available security options and deployments are merely representative, and they are provided to show how a new cloud burst environment may look considerably different than the original infrastructure.

The enterprise network bursting to an external cloud as depicted in FIG. 7 is not intended to be limited. Either the source or target may be one of: a private cloud, a shared cloud, bare metal, or combinations thereof. The burst is automated by a burst system 715 is a known manner. The particular details of the burst operation are not intended to be limiting; typically, and as noted above, bursting is achieved by cloning the application(s) (after the technique of this disclosure is carried out first.

In this example scenario, it is assumed that the cloud burst target (the new cloud provider) will have the same security level as that in the enterprise (the burst source). Generally, and as will be seen, the technique of this disclosure determines (and facilitates provisioning of) at least a minimal security environment needed to meet that security level (or, more generally, the security requirements) of the cloud application in the new cloud provider, According to approach of this disclosure, the following operations may be carried out. The order of these operations may vary, and one or more of the operations may be combined. First, the system identifies the broad security requirements of the existing application (running in private cloud 704, the burst source). The system also identifies the security capabilities of the new cloud provider 702, the burst target. Using this information, the system preferably then computes at least the minimal environment needed to meet the security requirements in the new cloud provider. The system then deploys the security assurance service on the new cloud provider, either by extending the security assurance service running in the enterprise, or by instantiating in the burst target a new instance of the security assurance service. Using the new security assurance service, the system configures a new security topology for the application (in the new cloud) that meets at least the minimum requirements, namely, the security level in the burst source environment. The burst system then deploys the application into the new security environment to complete the bursting process.

The notion of provisioning the minimal security environment in the new cloud provider is preferred, but a more robust security environment (having additional capabilities) may also be provided.

Figure 8:
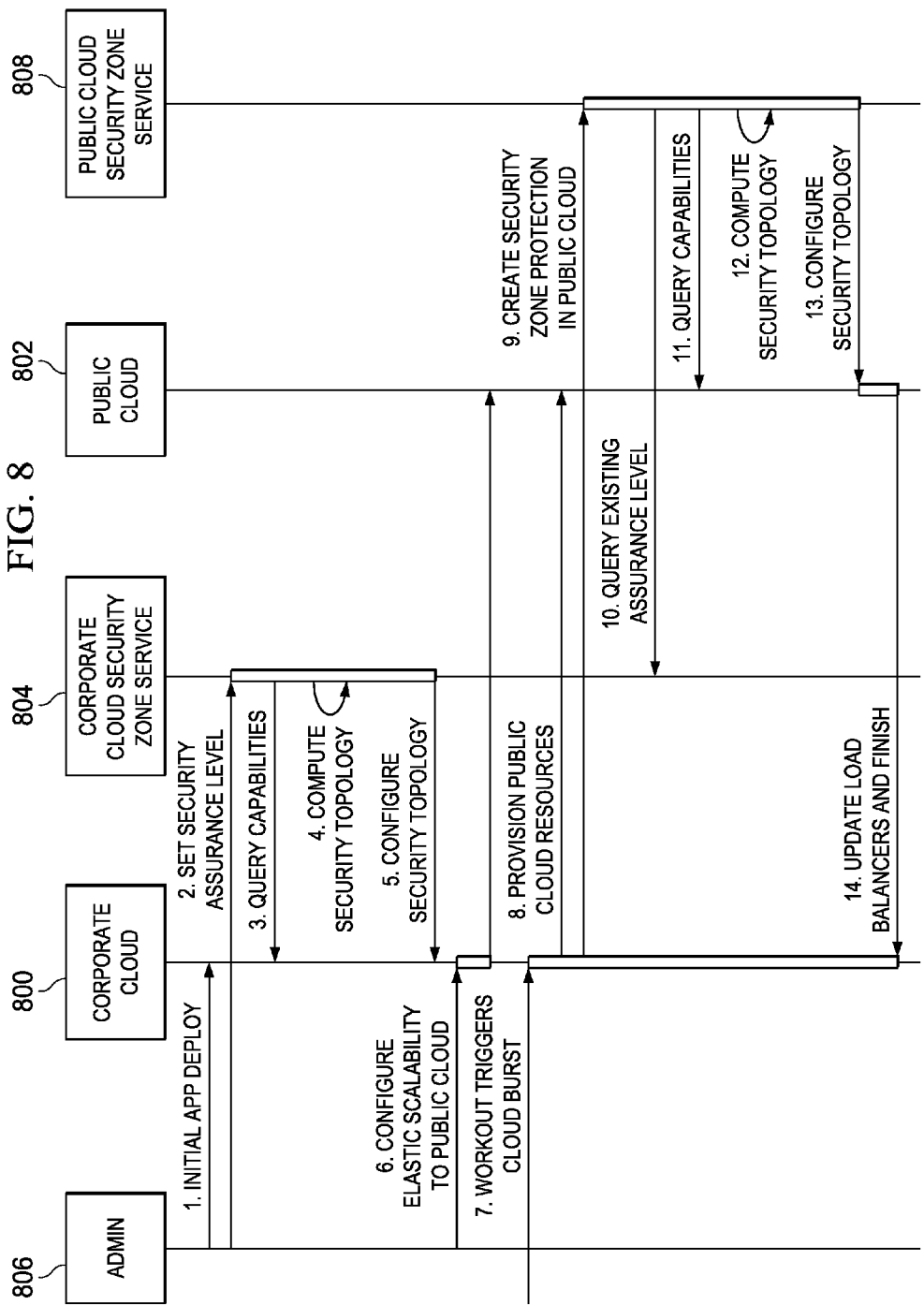
FIG. 8 depicts a sequence diagram for a typical flow in a cloud burst scenario with secure applications zones according to this disclosure.

FIG. 8 depicts a sequence diagram that provides further details of the above-described process. In this sequence diagram, the corporate cloud 800 represents the enterprise network (FIG. 7, element 700), and the public cloud 802 represents the external cloud (FIG. 7, element 702). The corporate cloud 800 comprises a security assurance service 804, such as described above, and the burst system also may include an administrative interface 806. The public cloud 802 is configured to have an associated security assurance service instance 808, which, as noted above, may be an extension of the service 804, or a separate new instance of the security assurance service.

Steps (1)-(5) shown in the sequence diagram in FIG. 8 represent the operation of the security assurance service 804 as described above with respect to FIG. 6. In particular, the administrator begins by initiating deployment of the application (step (1)). At step (2), the administrator sets the desired security level by interacting with the security assurance service 804. At step (3), the security assurance service queries the corporate cloud 800 to determine its capabilities and their availability to support the application being deployed. At step (4), the security assurance service 804 computes the security topology necessary to support the application according to the security assurance level specified at step (2). The security assurance service then configures the security topology at step (5), after which the application is deployed locally in the corporate cloud 800. Up to this point, there has been no bursting.

At step (6), the administrator configures an elastic scaling parameter to the public cloud 802, which enables the public cloud 802 to become a burst target in the event bursting becomes necessary. Step (6) also has the effect of isolating the workload from the security environment, because the workload is the driver of scalability.

At step (7), the workload associated with the application has triggered a threshold indicating that bursting of the application is now necessary to meet a demand. As described above, bursting the workload into a new environment typically involves using one or more known bursting techniques, such as cloning, that are enhanced according to this disclosure. Thus, and in response to step (7), the routine continues at step (8). At step (8), the corporate cloud 800 begins a process, typically automated, to provision the necessary public cloud resources to enable bursting of the application to the public cloud (the target). It is at this point that the techniques of the subject disclosure preferably are initiated.

Step (8) may include a number of ancillary operations or provisioning functions, as now explained. In a simple scenario, the public cloud 802 is known in advance and has sufficient compute resources to act as the burst target. In a more typical scenario, however, the burst target is not necessarily determined in advance but, rather, is selected dynamically or "on-the-fly" as needed once the workload triggers the cloud burst. To this end, it is assumed that cloud 802 is just one of several possible burst targets (e.g., private cloud(s), shared cloud(s), bare metal, etc.). Thus, at step (8) preferably the system identifies cloud security capabilities by category (e.g., IPS, SIEM, etc.) to know which capabilities are available for each of the clouds that might be candidates for the burst. If more than one burst candidate is available to be selected (because it has the necessary minimum security capabilities), the system may make a selection of one of the candidates based, for example, on an estimated cost of the security resources to meet the security level requirement. The selection, in the alternative, may be based on other considerations, such as load, anticipated latency, or some combination of load, latency and cost. After making the selection of the cloud provider burst target based on the security capabilities needed for the specific application and those available, the system extends the security zone management to the new environment, either by configuring a new instance of the security assurance service 808, or by extending the coverage of resources by the security assurance service 804. Thus, as depicted in FIG. 8, the security assurance service 808 may be pre-configured, e.g., as an extension of the existing security assurance service 804, or it may be created "on-the-fly" as a new instance of the security assurance service. In other words, the security assurance service in the target environment may be created in advance of a cloud burst triggering event, or in response to that triggering event.

In an alternative embodiment, if a burst target is not available with sufficient resources, the system may block the burst automation entirely (or until sufficient resources free-up). If the new environment (or any one of them, if multiple ones exist) does not contain sufficient security resources, the system may prompt a user to intervene (thereby stopping the automated process) to determine next steps, such as notifying the system administrator of the security gap in the new environment, requesting manual deployment, or requesting deployment of additional capabilities in the cloud. As an alternative to automatic halting of the burst due to insufficient resources, the system may pre-deploy into a "test mode" to check availability of resources for specific burst scenarios while otherwise waiting until a satisfactory burst target becomes available.

Once the burst target is provisioned and the security assurance service 808 configured, the routine continues at step (9). In particular, and at this step, the corporate cloud 800 issues a request to the public cloud security assurance service 808 to create a secure application zone for the application that is the subject of the burst. As will be seen, and according to this disclosure, preferably the configuration of the secure application zone within the public cloud (the burst target) is based on a combination of the security requirements of the application, as well as the available resources in the new environment.

To this end, and referring back to FIG. 8, at step (10) the security assurance service instance 808 queries the security assurance service 804 to identify the existing security assurance level for the application. In the alternative, this information (i.e., the stored security requirements for the bursting application) may be communicated to the security assurance service instance 808 proactively. At step (11), the security assurance service instance 808 queries the public cloud to determine its capabilities including the availability of existing resources to support the application being burst. This operation is analogous to that in step (3) above. Steps (10) and (11) may take place in a different order.

At step (12), the security assurance service 804 computes the security topology necessary to support the application according to the security assurance level specified at step (2). This calculation typically depends on the particular resources identified, for example, in step (11), although a portion of this calculation may also be based on reuse of existing resources (e.g., a DMZ) for the bursting application. Typically, and as noted above, the calculation identifies at least the minimum topology needed to meet the security level in the new cloud provider.

Given the anticipated differences across cloud infrastructures (see, e.g., FIG. 7), it is likely that the calculated topology will not match the original security topology. At step (13), the security assurance service 808 configures the security topology. If necessary, and at step (14), the target cloud may update resources that are shared across the environments as needed (e.g., load balancers, DDoS protection, DMZ, etc.) to complete the set-up process for the new security environment. Once the new security environment is established by the security assurance service 808, a security application zone is now available for the burst application. The burst operation is then completed, and the application operates normally in the newly scaled-out cloud.

The secure application zone (e.g., zone 720 in FIG. 7) that is configured as described may be made available to other bursting deployments as needed.

Typically, and once the burst requirements for the cloud application go away, the security assurance service 808 may retire the secure application zone. If at the time the original burst dies-down the secure application zone is still in use (e.g., by other burst deployments), the security assurance service 808 can determine which portions if any can be scaled back and then do so. As a skilled person will appreciate, the environment de-scaled in this manner may have an effect on security topology in the original environment to the extent there is any sharing across infrastructures (e.g., a shared DMZ). Thus, the security assurance service 808 also needs to take such issues into consideration during any de-scaling operation.

As noted above, and according to an aspect of this disclosure, when multiple cloud providers are available as potential cloud burst targets, the choice of cloud provider in a burst scenario can be identified by security requirements. In particular, the choice of cloud provider needs to be an environment that can provide the desired security topology. If multiple providers can provide security capabilities, the provider can be selected based on other factors, such as estimated resource cost, performance, and physical location as preferred by the customer. Further, when multiple cloud offerings (such as private cloud, shared cloud, bare metal, etc.) are available on the selected cloud provider, the offering can also be selected based on estimated cost of security resources to meet requirements.

As a further variant, the cloud provider also can be selected based on estimated changes of security topology and capabilities of the cloud providers. For example, the system can choose a cloud provider with a wider range of capabilities, with the expectation that other security capabilities will be needed. As also described above, when a cloud burst scenario arises for an application where the cloud target has insufficient security capabilities for a matching security zone, the system can block deployment to the cloud zone, and/or notify the system administrator of the security gap in the new environment for manual deployment or to request additional capabilities in the cloud. If the capabilities later become available in the cloud, the security zone service can then deploy those capabilities to fill gaps.

If the local application security requirements change, the updated requirements preferably are communicated to the remote security assurance service. Moreover, and using the techniques of this disclosure, when the updated security requirements cannot be met in the existing cloud environment, the security assurance service may migrate the topology to a more capable cloud provider.

As also described above, in some cases security resources (e.g., load balancers, DDoS protection, etc.) may be shared across environments depending on requirements and available resources. When removing burst capability, any security changes to the base topology caused by the burst scenario preferably are removed (un-done). As another feature, when a first workload is already bursting to the target environment, and a second workload has similar security requirements, the security infrastructure established for the first workload preferably is shared with the second workload where possible. When a security environment is shared in this manner, the system needs to ensure that there are no policy rules that prevent particular workloads from being co-located in the same security zone.

The technique of this disclosure provides numerous advantages. The approach enables a burst application to be protected within a secure application zone in the new cloud provider despite the fact that the resources available in the cloud burst environment may be considerably different than the original infrastructure. In this regard, the secure application zone provides for at least the same (or greater) degree of protection afforded to the cloud application by the original infrastructure. The approach provides for automated deployment of a security zone environment in a cloud burst scenario, wherein the configuration of the security zone preferably is based on a combination of security requirements of the existing cloud application (and perhaps other applications) and available resources in the new environment. The approach enables selection of a cloud provider burst target, preferably based on security capabilities needed for the specific cloud application. The approach enables the burst automation to be blocked (or delayed) when insufficient security resources are available in the burst target. Further, when multiple cloud providers are available (or where a single cloud provider has multiple cloud options), the selection of cloud provider (or cloud option, as the case may be) preference can be based on estimated cost of security resources to meet requirements. Further, when base security requirements change, the technique provides for reconfiguration of the remote environment and/or migration of the remote environment itself to a still-better provider (e.g., based on cost, capability, or the like). The approach facilitates enhanced sharing of resources across cloud providers when possible and appropriate to meet security and resource requirements, and/or to enable bursting of an application to a destination that is already handling a burst scenario for another application. Further, the approach provides for de-provisioning of security zones when burst resources are retired, as well as re-configuring the base security zone if it affected by any such remote de-provisioning.

According to another embodiment, the security assurance service instance may be implemented in the new cloud provider in advance of any actual bursting operation.

The following describes representative or additional capabilities of the security assurance service. One or more of these additional capabilities may be provided as desired.

The security assurance service may analyze an existing security environment to identify interactions for customized configuration steps, e.g., the service may determine that a virtual private network (VPN) may not be necessary in a particular configuration because the network is already isolated by some other device, network or mechanism.

The security assurance service may operate to update configurations based on other deployments. Thus, for example, if a web security gateway is deployed and is already using certificates for other applications, the security assurance service may recognize this and merely upgrade the newly-deployed application to use certificates as well.

Preferably, security templates available in the system (e.g., in a pattern editor) may include wiring and interaction logic. As a simple example, if a high-level "Intruder Protection" template has been selected, the system will inhibit a lower level template of this type from being applied. As another more complex example, a security administrator may have set a policy that the network must be at least as secure as the applications it hosts; then, if the user selects high-level data security, the internal network security may be automatically upgraded (e.g., in the pattern editor) to high-level.

Preferably, a security administrator interacts with the security assurance service directly to apply templates to existing deployments, e.g., to upgrade security settings for an application that may have been attacked.

Preferably, the service enables a security administrator to override a particular categorization. As a non-limiting example, a highly-secure bank network may require a higher level of controls even with respect to an otherwise "low-level" security category.

Preferably, the security assurance services records configuration settings and can remove security configuration steps when an application is removed from the system. This security "removal" function preferably also interacts with other systems, e.g., optionally downgrading security levels of other applications if their security has been upgraded only for the application being removed.

Preferably, the security administrator is provided the ability to change security templates available in the service, as well as the ability to change rules around which templates must be used in certain circumstances.

Preferably, the security assurance service interacts with one or more cloud platforms for management of the virtualized resources. Thus, for example, the security assurance service may query existing software catalogs in the enterprise to determine security software installed, as well as their locations and available resources. The service also may try to auto-discover software in the network, or it may query specific security solutions (such as a log manager) to discover other software installed in the system.

Preferably, and if resource consumption from high-level security options are a concern, the security assurance service can estimate overall cost of the selected security template(s) and present this information to the application deployer for approval. Or, a security expert optionally may configure "maximum" and "minimum" total security levels allowed and required for particular types of applications.

Preferably, a security administrator can use the security assurance service to prevent deployment of applications if security templates of minimum security levels have not been selected.

Preferably, the security assurance service can mine patterns between application deployments and commonly selected security levels to automatically suggest security levels for new applications being deployed.

Preferably, the security assurance service can interact or interoperate with security analytics systems or services (e.g., Rational AppScan) during application deployment to gauge overall security level of a deployed application and determine if it fits within an enterprise security policy.

The service also preferably provides for "patching" of security assurance templates, either manually or automatically (e.g., through an auto-update tool), to improve security recommendations based on selected templates, and to retroactively apply new security configurations to existing applications.

Preferably, the service can receive reports or other outputs describing common vulnerabilities or attack pattern files (e.g. APT patterns) and determine if such an attack would be prevented with an existing security configuration. In the event of possible attack exposure, the service then generates and optionally applies configuration changes to protect the environment.

As noted above, preferably the security assurance service operates in conjunction or in association with existing cloud application platform infrastructure including, without limitation, a cloud application platform with workload deployment functionality. In this manner, the security assurance service supplements or works in across the cloud infrastructure to facilitate secure context-based application deployment.

The security templates and their associated security configuration changes are implemented during the application deployment process. In that example, the application deployment is initiated, then the security configuration changes are carried out, after which the remainder of the application deployment process contemplates. While this is a typical operating scenario, the security configuration changes may be implemented orthogonally to the actual deployment itself. Thus, for example, the security configuration changes may be implemented in an off-line process before the actual application deployment is initiated. In the alternative, the application deployment may be in initiated and completed, and then followed by a separate execution thread of the security assurance service. Thus, a given context-based cloud application security zone may be created before, during or after actual application deployment.

The tooling required for implementing the security configuration changes for one or more particular security resources (as identified by a particular security template) may be specified or controlled by the template directly, or indirectly.

As described, the approach herein may be implemented manually or in an automated manner, in whole or in part.

While a preferred operating environment and use case (a cloud deployment appliance or platform) has been described, the techniques herein may be used in any other operating environment in which it is desired to deploy applications or other services while enforcing a given security context.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment as described above, the functionality provided herein is implemented as an adjunct or extension to an existing cloud compute deployment or burst management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, computing entities that manage cloud deployments, as well as improvements to the functioning of the application deployment or bursting mechanism itself.

Having described our invention, what we now claim is as follows.

The invention claimed is:

1. A method to facilitate bursting of a cloud application to a new cloud provider, comprising:
    identifying a set of security requirements of the cloud application, the set of security requirements being associated with a security assurance level;
    identifying a set of security capabilities of a candidate new cloud provider; determining a minimal security environment needed to meet the security requirements of the cloud application in the new cloud provider;
    deploying a new security environment in the new cloud provider having at least the security capabilities of the minimal security environment; and receiving and deploying the cloud application in the new security environment by completing a burst operation;

wherein the new security environment comprises a security assurance zone configured to meet the security assurance level, the security assurance zone based on a combination of the security requirements of the cloud application and available resources in the new security environment.

2. The method as described in claim 1 wherein the determination of the minimal security environment occurs in an automated manner responsive to receipt of an indication that a workload associated with the cloud application has triggered a cloud burst operation.

3. The method as described in claim 1 further including deploying the security assurance zone by configuring security settings for the one or more security resources corresponding to the security assurance level.

4. The method as described in claim 1 further including:
selecting the candidate cloud provider from a set of candidate cloud providers, wherein the candidate cloud provider is selected from the set based on the security requirements of the cloud application and the cost or availability of respective security capabilities in each of the candidate cloud providers.

5. The method as described in claim 1 further including:
detecting a change in the set of security requirements of the cloud application; and
responsive to detecting the change, taking an action that is one of: reconfiguring the new security environment, and migrating the new security environment to another cloud provider.

6. The method as described in claim 1 wherein the cloud application is replicated from an internal enterprise environment to an external cloud environment, each environment having a different set of security capabilities.

7. Apparatus, comprising:
a processor;
computer memory holding computer program instructions executed by the processor to facilitate bursting of a cloud application to a new cloud provider, the computer program instructions comprising program code operative to:
identify a set of security requirements of the cloud application, the set of security requirements being associated with a security assurance level;
identify a set of security capabilities of a candidate new cloud provider;
determine a minimal security environment needed to meet the security requirements of the cloud application in the new cloud provider;
deploy a new security environment in the new cloud provider having at least the security capabilities of the minimal security environment; and
receive and deploy the cloud application in the new security environment by completing a burst operation;
wherein the new security environment comprises a security assurance zone configured to meet the security assurance level, the security assurance zone based on a combination of the security requirements of the cloud application and available resources in the new security environment.

8. The apparatus described in claim 7 wherein the determination of the minimal security environment occurs in an automated manner responsive to receipt of an indication that a workload associated with the cloud application has triggered a cloud burst operation.

9. The apparatus as described in claim 7 wherein the program code is further operative to deploy the security assurance zone by configuring security settings for the one or more security resources corresponding to the security assurance level.

10. The apparatus as described in claim 7 wherein the program code is further operative to:
select the candidate cloud provider from a set of candidate cloud providers, wherein the candidate cloud provider is selected from the set based on the security requirements of the cloud application and the cost or availability of respective security capabilities in each of the candidate cloud providers.

11. The apparatus as described in claim 7 wherein the program code is further operative to:
detect a change in the set of security requirements of the cloud application; and
responsive to detecting the change, take an action that is one of: reconfiguring the new security environment, and migrating the new security environment to another cloud provider.

12. The apparatus as described in claim 7 wherein the cloud application is replicated from an internal enterprise environment to an external cloud environment, each environment having a different set of security capabilities.

13. A computer program product in a non-transitory computer readable medium for use in a data processing system, the computer program product holding computer program instructions executed by the data processing system to facilitate bursting of a cloud application to a new cloud provider, the computer program instructions comprising program code operative to:
identify a set of security requirements of the cloud application, the set of security requirements being associated with a security assurance level;
identify a set of security capabilities of a candidate new cloud provider;
determine a minimal security environment needed to meet the security requirements of the cloud application in the new cloud provider;
deploy a new security environment in the new cloud provider having at least the security capabilities of the minimal security environment; and
receive and deploy the cloud application in the new security environment by completing a burst operation;
wherein the new security environment comprises a security assurance zone configured to meet the security assurance level, the security assurance zone based on a combination of the security requirements of the cloud application and available resources in the new security environment.

14. The computer program product described in claim 13 wherein the determination of the minimal security environment occurs in an automated manner responsive to receipt of an indication that a workload associated with the cloud application has triggered a cloud burst operation.

15. The computer program product as described in claim 13 wherein the program code is further operative to deploy the security assurance zone by configuring security settings for the one or more security resources corresponding to the security assurance level.

16. The computer program product as described in claim 13 wherein the program code is further operative to:
select the candidate cloud provider from a set of candidate cloud providers, wherein the candidate cloud provider is selected from the set based on the security requirements of the cloud application and the cost or availability of respective security capabilities in each of the candidate cloud providers.

17. The computer program product as described in claim 13 wherein the program code is further operative to:
   detect a change in the set of security requirements of the cloud application; and
   responsive to detecting the change, take an action that is one of: reconfiguring the new security environment, and migrating the new security environment to another cloud provider.

18. The computer program product as described in claim 13 wherein the cloud application is replicated from an internal enterprise environment to an external cloud environment, each environment having a different set of security capabilities.

* * * * *